Patented Oct. 26, 1937

2,097,144

UNITED STATES PATENT OFFICE 2,097,144

PRODUCTION OF BUTTONS AND LIKE ARTICLES

Peter C. Christensen, East Orange, N. J.

No Drawing. Application July 16, 1932, Serial No. 623,006

9 Claims. (Cl. 18—47.5)

My invention relates to the production of buttons and similar articles and more particularly to an improved method of producing such articles preferably from a material which is composed principally of casein.

The principal object of my invention is to produce buttons or the like from material of the character specified, either in solid colors or in multi-tone or mottled effects, as desired, which will be at least equal and in many cases superior in color, appearance, toughness, durability and other qualities, to the majority of the buttons made in accordance with present practices from various materials, such as vegetable ivory, bakelite, casein, etc., now generally employed.

Another object of my invention is to provide an improved and simple method which is adapted to effectively and economically produce buttons from such material, and which results in a high output of finished buttons, an extremely low percentage of rejections, and substantially no waste of the material from which the buttons are made.

A still further object of my invention is to so produce buttons from material of the character described, that they may be colored, either in solid tones or mottled effects and preferably by the use of natural wood dyes, so effectively and to such a depth that the color will endure and be substantially unaffected in the various operations to which the buttons are subjected subsequent to the dyeing or coloring thereof.

Another object of my invention is to provide an improved casein material which is peculiarly adapted for the production therefrom, in accordance with my improved method, of buttons having the desirable characteristics indicated above.

Other objects and features of my invention will be apparent or will occur to those skilled in the art, from the following description and the appended claims.

The material from which buttons are made in accordance with my invention consists principally of casein, and is preferably a suitable mixture of casein, water and alum (aluminum potassium sulphate). The casein employed may be any of those commercial forms known to the trade as rennet casein, hydrochloric acid casein and acetic acid casein, but I find that best results are obtained by using rennet casein. Also while I prefer to use alum (aluminum potassium sulphate) in producing the mixture referred to, any one of a number of other materials including other alums, such as aluminum ammonium sulphate and aluminum sodium sulphate, may be employed to advantage instead of alum (aluminum potassium sulphate).

The commercial casein is in the form of a dry powder containing from 4% to 5% by weight of water. In forming the mixture or material referred to, the amount of water added may be from 10% to 25% by weight of the casein. The percentage of water added to obtain best results is dependent somewhat on the diameter of the rods to be produced as hereinafter described, from the mixture or composite casein material. For best results a lesser proportion of water should be added to the casein for the production of small rods and a greater proportion for large rods. For a uniform mixture to be used for all sizes of rods, I find it preferable to add an amount of water which is substantially 15% by weight of the casein employed.

Where alum is mixed with the casein and water, the amount of alum added may vary from 1% to 5% by weight of the casein, but I preferably add substantially 2% by weight of the casein.

In producing the composite material, the casein, water and alum are merely all introduced into an ordinary mixing machine and the latter is operated until these substances are thoroughly commingled and a uniform mixture is obtained. This usually takes from 5 to 10 minutes. If the buttons or other articles to be produced are to be of a single solid color, a suitable dyeing material, or where the finished articles are to be solid white, a white pigment, may be advantageously added at this point to the casein and other substances and mixed therewith in the mixing machine. The mixing operation may be carried on at ordinary room temperature.

The mixture produced as just described, is in granular or rather coarse powder form, and is now highly compressed in a suitable extrusion press into a solid coherent material. This solid material as extruded from the press, is of uniform cross section and is usually, though not necessarily, cylindrical. As it issues from the press the said material, which is fairly soft and flexible, is cut into rods of any desired length, usually a length of from three to four feet. The press may be adjusted to produce cylindrical rods of any diameter from 0.1" up to 2.5", which may be desired. The rods thus produced are immediately immersed in water which is at substantially room temperature, and left therein for about one-half an hour. They are then removed from the water and maintained in the open air at ordinary room temperature for a period of from twenty-four hours up to a month or more, depending on when it is desired to use the rods for the production of the buttons or other articles to be made therefrom. After being removed from the water, however, the rods should be kept where the air is of such humidity as to prevent the moisture in the rods from drying out to any appreciable extent. By the simple treatment just described, the material of the rods is hardened and stiffened somewhat but is still in a relatively uncured and relatively soft condition. The mixture prepared as above described and from which the rods are formed is, as indicated, a uniform mixture. Rods produced from such mixture in the manner set forth, accordingly are of uniform texture and have a uniform distribution of the material thereof throughout their cross-sections. This is important as will hereinafter appear.

Where buttons, for example, are to be made in accordance with my invention, the rods produced and treated as above described and while still in a relatively uncured condition, are usually each turned into a large number of blanks which substantially conform in size and shape to the finished buttons by a turning machine, preferably of the type disclosed in Patents Nos. 1,819,811 and 1,843,944, respectively granted August 18, 1931 and February 9, 1932 on applications of Emanuel Clemens, which automatically and very rapidly faces, edges, backs and cuts off the blanks from the rod by successive turning cutting operations as described in said patents. Because buttons thus made directly from the relatively uncured rods are produced by turning cutting operations only, each of such buttons is circular and is also of uniform shape in all its radial cross-sections.

The shavings and the like produced in turning buttons to shape directly from the relatively uncured rods are not waste, for the same upon being dried and ground may be advantageously mixed with the raw commercial casein, in any quantity up to 50% by weight of the latter, and the resulting mixture may then have water and alum or other suitable material added thereto and combined therewith, as hereinbefore described, to obtain the composite casein material from which the relatively uncured rods, referred to above, are produced.

The buttons or other articles when turned to shape from rods of relatively uncured material in the manner described above, are next cured to harden and toughen the same preferably by treatment with a formaldehyde solution. While, technically, proper curing of the buttons can be obtained by treating the same with a formaldehyde solution which may be anywhere from a 10% to a 20% solution, I find that best results are obtained, especially when the buttons are subsequently dyed, by using a solution of from 10% to 15% in strength. In any event, when it is desired to obtain a uniform color effect in dyeing a given lot of buttons, the latter should be cured by treatment with formaldehyde solution of a given and unvarying uniform strength. I preferably treat the buttons with a solution produced by mixing three parts, by volume, of water with one part of the ordinary 40% solution of formaldehyde gas, although as indicated, this is subject to considerable variation. If a stronger than a 20% solution of formaldehyde is used, the curing of the outer or surface portions of the buttons is effected too rapidly and it is likely that the inner portions will not be sufficiently cured. The buttons are merely immersed and left in the solution until thoroughly cured throughout. This usually takes several days, as with a solution of the strength indicated as preferable, effective curing proceeds at the rate of about 1½ to 2 days per millimeter in thickness of the material being treated.

Various processes have heretofore been suggested or employed for producing buttons from casein material. Some of these processes involve the cutting of the buttons from cured rods, while others involve the molding of casein material when in an uncured or partially cured condition or when combined with hardening and converting agents. I believe I am the first to disclose a practical process of producing satisfactory buttons involving the turning of buttons in their final size and shape directly from relatively uncured rods of casein material and the subsequent curing of the buttons thus formed. In this connection when shaped articles formed of substantially uncured or relatively uncured casein material are cured, as by subjecting them to the action of a solution of formaldehyde or other suitable hardening agent, internal stresses are apparently set up therein with the result that there is a decided tendency for the articles to warp and become deformed, this tendency being particularly pronounced in the case of comparatively thin articles such as buttons. I have found, however, that if each of a lot of substantially uncured or relatively uncured buttons or similar articles of casein material is circular and has a uniform texture and distribution of the material thereof and if each of the buttons is of uniform shape in all its radial cross-sections, then such button upon being cured will not be deformed, or, at least, the deformation thereof will be so slight as to be negligible. This is probably due to the fact that when substantially uncured or relatively uncured buttons or articles of casein material in respect of which the conditions just described prevail, are cured, the stresses set up therein as the result of such curing are substantially balanced.

After being cured by immersion in formaldehyde solution as above described, the buttons are scoured in the usual manner by subjecting the same at room temperature to the action of a mixture of pumice and sawdust, or the like, in a rotating drum. This scouring operation when effectively performed, takes about 24 hours.

The buttons are next drilled, preferably in an automatic drilling machine to provide the same with the desired number and arrangement of holes. The drilled buttons are then preferably prepared for the finishing and polishing treatments (if they are white or of any solid color and are not thereafter to be dyed) or for dyeing, finishing and polishing (if they are still to be dyed), by drumming the same in the usual manner for a period of from 24 to 48 hours, with a mixture of powdered chalk, sawdust and bran, or other suitable mixture. This imparts a preliminary polish to the buttons.

After imparting such preliminary polish to the buttons, the latter are subjected to further treatment which involves additional polishing thereof, either mechanically or chemically according to the finish and appearance desired, and which in case the buttons are then white and it is intended that when finished they shall be colored either in a single tone or multi-tone effect, also involves the dyeing of the buttons with suitable coal-tar or natural dyes.

In case the buttons upon being given the said preliminary polish, are to be finished by mechanically polishing them and without being dyed, they are first subjected to the action of a finely divided mixture of sawdust and bran, or other suitable material, in a rotating drum for a sufficient period, generally from 24 to 48 hours. The buttons are then introduced together with a quantity of small wax-coated wooden pegs into a rotatable tumbling machine and the latter is continuously operated for a period of from 3 to 8 hours. The buttons are thus given a further polish, but while this polish is of sufficient body it is rather dull. Accordingly the buttons are now introduced into a tumbler drum together with uncoated wooden pegs, and such drum is rotated continuously for about 2 hours. This operation imparts a final bright polish to the buttons, which are now finished and need only to be sorted, inspected and packed.

Where the buttons after being given the preliminary polish, are to be mechanically polished and are also to be dyed either a solid color or in a two-tone color effect, the polishing step last described is usually omitted, and the buttons are soaked in water at room temperature for several hours so that they will better absorb the dye. If the buttons are to be dyed a solid color, they are then immersed in a suitable dye solution and are removed therefrom when the desired shade (which is determined by inspection) is obtained. This dyeing operation usually requires from about 5 to 30 minutes. The dye solution may be an ordinary solution of an aniline or a wood dye, or of any other suitable coal-tar or natural dye. Upon removal from the dye solution, the buttons are immediately immersed in a suitable fixing bath to set the color. The fixing bath employed is a weak solution of bichromate of potash or other suitable mordant. To thus set the color usually requires about 5 minutes, after which the buttons are removed from the fixing bath, washed and dried in a suitable drying room maintained at a temperature of from 75 degrees to 110 degrees F. After being thoroughly dried, the buttons are introduced into a tumbling machine together with suitable material, preferably small wooden pegs, and such machine is then continuously operated for about an hour. The scum and any foreign material which may have accumulated on the surfaces of the buttons during the dyeing thereof, will be thus effectively removed and the buttons will also be further polished. Upon removal from the tumbling machine the buttons are finished and need only to be sorted, inspected and packed.

In case the buttons are to be mechanically polished and also dyed in a two-tone color effect, said buttons after being preliminarily polished and soaked in water as above described, are disposed face up and in a uniform arrangement on trays or other suitable supports. Stencil charts or sheets, the forms of which are dependent upon the designs or mottled effects desired for the buttons, are then respectively disposed on the trays and over the buttons thereon. The trays with the buttons and stencil sheets thus disposed thereon, are then moved slowly past a device or devices for spraying a suitable dye solution, whereupon the faces of the buttons receive partial coatings of the solution, which coatings are fairly heavy and uniform and of a design corresponding to the design of the stencil sheets. A sufficient amount of terra alba is incorporated in the dye solution to prevent the same from flowing after being thus sprayed onto the buttons. The buttons are now dried in the open air and at room temperature for a period of several hours, after which they are subjected to the action of a fixing solution to set the color, and washed in the same manner as described above, when the buttons are dyed a solid color. The buttons are now ready to receive another coating of dye, which where a two-tone effect is desired, will be the final coating. Such final coating is thereupon applied by immersing the buttons in a suitable dye solution, and maintaining the same in such solution for the proper period, after which the buttons are subjected to the action of a fixing bath to set the color of the final coating, washed and dried, all as hereinbefore described in connection with the dyeing of buttons in a solid color. The dried buttons are thereupon polished in tumbling machines first with wax-coated wooden pegs and then with uncoated wooden pegs exactly as above described in respect of buttons which are finished by mechanical polishing and without being dyed, and are then ready to be assorted, inspected and packed.

Where buttons after receiving the preliminary polish, as hereinbefore described, are to be chemically polished, the procedure is preferably substantially as follows: A solution for treating the buttons is made by thoroughly mixing about 50 parts by weight of water, one part by weight of chloride of lime, and one part by weight of any one of the following substances: carbonate of soda (soda ash), bi-carbonate of soda, and potassium carbonate. This solution is heated to a temperature which is preferably within the limits of 170 degrees and 212 degrees F. The buttons are introduced into this heated solution in such a quantity as to be well covered and are maintained in the solution, with occasional stirring, until they have acquired the desired smoothness and lustre. This usually takes from 15 to 30 minutes. The buttons are then removed from said solution and washed, and if they are not to be dyed, are then dried and if desired, are given a final polish by rotating the same for about 1 hour in a tumbling machine with suitable material such as a quantity of dry or unwaxed small wooden pegs. This last polishing step is not essential, but is often desirable. The buttons are now finished and ready to be sorted, inspected and packed.

If buttons after being given the preliminary polishing treatment, are to be chemically polished and dyed a solid color, they are first treated, as and dyed a solid color, they are first treated, as just described, with a solution of a mixture of chloride of lime and soda ash (or bi-carbonate of soda or potassium carbonate in place of soda ash) to provide the same with a smooth lustrous finish, and are then washed. The buttons are thereafter dyed, subjected to the action of a fixing bath, washed, dried and finished; the treatment being identical with that hereinbefore described for buttons which are mechanically polished and dyed a solid color, except that the soaking of the buttons in water may be, and preferably is, omitted.

When buttons after receiving the preliminary polishing treatment, are to be chemically polished and dyed to produce a two-tone or mottled color effect, they are first treated to obtain the smooth lustrous finish or chemical polish, as already described, and then washed. The subsequent treatment of the buttons thus chemically polished, is exactly the same as that above described for buttons which are mechanically polished and dyed in a two-tone color effect up to and including the steps of fixing, washing and drying the buttons which follow the application thereto of the second and final coating of dye, except that the soaking of the buttons in water may be, and preferably is, omitted. The buttons are then subjected to the action of suitable material, such as small wooden pegs, in a tumbling machine for about one hour, to remove the scum and any foreign material which may be present on their surfaces, after which they are ready for sorting, inspection and packing.

Buttons which are mechanically polished present a somewhat richer and more attractive appearance than those which are chemically polished in the manner above described, but it is considerably more difficult to effectively dye such mechanically polished buttons to a sufficient depth. The soaking of the buttons in water, as described above, is of material assistance, as the buttons will absorb the dye much better when thus soaked. However, buttons which are chemically polished as herein disclosed, can be effectively dyed to an appreciable depth, either in a solid color or in multi-tone color effects, with comparative ease. For some reason which is not apparent, the chemical polish thus imparted to the buttons, greatly increases their adaptability for absorbing and retaining the dye.

It is to be understood that my invention as described herein is subject to many changes and modifications which entail no departure from the spirit of the invention and which lie within the scope of the appended claims.

Having now described my invention, I claim:

1. The method which consists in subjecting cured articles formed of material consisting principally of casein to the action of a solution of a mixture of chloride of lime and one of the group of materials consisting of carbonate of soda, bi-carbonate of soda and potassium carbonate, and then dyeing said articles.

2. The method which consists in subjecting cured articles formed of material consisting principally of casein to the action of a solution of a mixture of chloride of lime and one of the group of materials consisting of carbonate of soda, bi-carbonate of soda and potassium carbonate.

3. The method which consists in subjecting cured articles formed of material consisting principally of casein to the action of a solution of a mixture of chloride of lime and one of the group of materials consisting of carbonate of soda, bi-carbonate of soda and potassium carbonate, then applying dye only to predetermined portions of the surfaces of said articles, then subjecting the articles to the action of a fixing solution, then applying dye to said articles over their entire surfaces, and then again subjecting the articles to the action of a fixing solution.

4. The method which consists in producing an uncured rod by extrusion of an intimate mixture of materials including casein and water and in which the casein predominates, cutting a plurality of buttons in their final shape directly from the uncured rod, curing the buttons thus produced, subjecting the cured buttons to a solution of a mixture of chloride of lime and one of the group of materials consisting of carbonate of soda, bicarbonate of soda and potassium carbonate, and then dyeing said buttons.

5. The method which consists in producing an uncured rod by extrusion of an intimate mixture of materials including casein and water and in which the casein predominates, cutting a plurality of buttons in their final shape directly from the uncured rod, curing the buttons thus produced and subjecting the cured buttons to a solution of a mixture of chloride of lime and one of the group of materials consisting of carbonate of soda, bicarbonate of soda and potassium carbonate.

6. The method which consists in forming a substantially uniform mass consisting principally of finely divided casein and water, the water content being less by weight than the casein content, extruding from such mass a homogeneous solid rod, substantially free from voids, substantially uncured and relatively soft, producing a plurality of buttons in their final shape directly from said rod by subjecting the same while it is still substantially uncured and in a relatively soft condition to turning cutting operations only, and then curing said buttons.

7. The method which consists in forming a substantially uniform mass consisting principally of finely divided casein and water, the water content being less by weight than the casein content, extruding from such mass a homogeneous solid rod, substantially free from voids, substantially uncured and relatively soft, producing a plurality of buttons in their final shape directly from said rod by subjecting the same while still substantially uncured and in a relatively soft condition to a plurality of successive turning cutting operations only for each button produced, and then curing said buttons.

8. The method which consists in forming a substantially uniform mass consisting principally of finely divided casein and water and containing a small amount of one of the alums, the water content being less by weight than the casein content, extruding from such mass a homogeneous solid rod, substantially free from voids, substantially uncured and relatively soft, producing a plurality of buttons in their final shape directly from said rod by subjecting the same while it is still relatively uncured and soft to turning cutting operations only, and then curing said buttons in a formaldehyde solution.

9. The method which consists in forming a substantially uniform mass consisting principally of finely divided casein and water and containing a small amount of aluminum potassium sulphate, the water content being less by weight than the casein content, extruding from such mass a homogeneous solid rod, substantially free from voids, substantially uncured and relatively soft, producing a plurality of buttons in their final shape directly from said rod by subjecting the same while it is still relatively uncured and soft to turning cutting operations only so that each button produced is of uniform shape in its radial cross-sections, and then curing said buttons in a formaldehyde solution.

PETER C. CHRISTENSEN.